United States Patent
Tanizawa

(10) Patent No.: US 8,174,947 B2
(45) Date of Patent: May 8, 2012

(54) EVALUATION APPARATUS AND EVALUATION METHOD

(75) Inventor: Seiji Tanizawa, Kanagawa (JP)

(73) Assignees: Sony Corporation, Tokyo (JP); Sony Disc and Digital Solutions Inc., Tokyo (JP)

( * ) Notice: Subject to any disclaimer, the term of this patent is extended or adjusted under 35 U.S.C. 154(b) by 0 days.

(21) Appl. No.: 12/908,620

(22) Filed: Oct. 20, 2010

(65) Prior Publication Data

US 2011/0096651 A1    Apr. 28, 2011

(30) Foreign Application Priority Data

Oct. 27, 2009   (JP) ................ P2009-246555

(51) Int. Cl.
*G11B 7/00* (2006.01)
(52) U.S. Cl. ................... 369/53.31; 369/53.16
(58) Field of Classification Search ............... 369/53.31, 369/53.16
See application file for complete search history.

(56) References Cited

U.S. PATENT DOCUMENTS

| | | |
|---|---|---|
| 2003/0016606 A1 | 1/2003 | Urita et al. |
| 2004/0257955 A1* | 12/2004 | Yamanaka et al. ........ 369/59.22 |
| 2006/0285461 A1 | 12/2006 | Ashizaki et al. |
| 2007/0109939 A1* | 5/2007 | Shimizu et al. ........... 369/59.22 |
| 2009/0122676 A1* | 5/2009 | Tanizawa ................. 369/53.16 |
| 2010/0202261 A1* | 8/2010 | Miyashita et al. ........ 369/47.15 |
| 2011/0032809 A1* | 2/2011 | Miyashita et al. ........ 369/53.31 |

FOREIGN PATENT DOCUMENTS

| | | |
|---|---|---|
| JP | 2009-123266 | 6/2009 |
| WO | WO 99/12166 A1 | 3/1999 |

OTHER PUBLICATIONS

European Search Report for European Application No. EP 10 17 6679, Date of Completion Nov. 25, 2010.
Lee, C. H. et al., "A PRML Detector for a DVDR System," IEEE Transactions on Consumer Electronics, vol. 45, No. 2, pp. 78-285, (1999).
Kobayashi, H. et al., "Effects of Limit Equalizer in Blu-Ray Disc Format," IEEE Transactions on Consumer Electronics, vol. 49, No. 4, pp. 1141-1147, (2003).

* cited by examiner

*Primary Examiner* — Latanya Bibbins
(74) *Attorney, Agent, or Firm* — Finnegan, Henderson, Farabow, Garrett & Dunner, L.L.P.

(57) ABSTRACT

An evaluation apparatus includes: a signal reading block; a first waveform equalization block; a boundary detection block; a selective output block; and an evaluation value generation block.

9 Claims, 9 Drawing Sheets

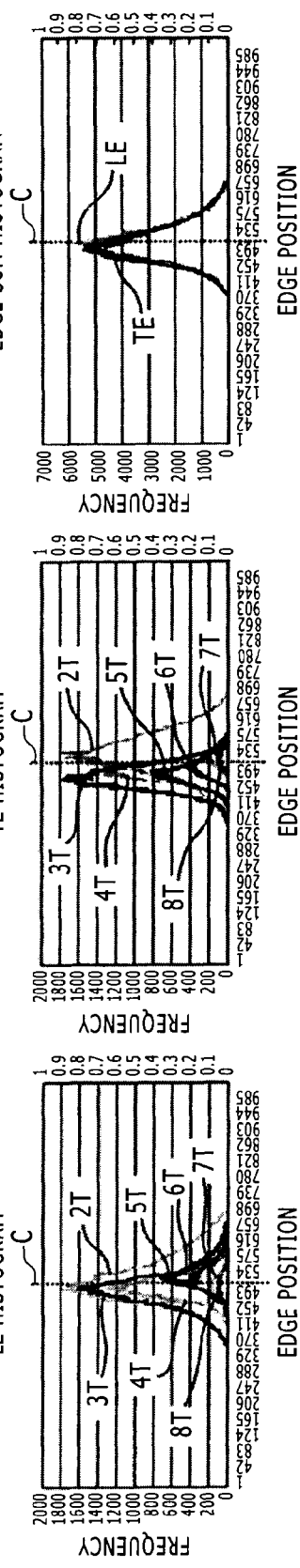
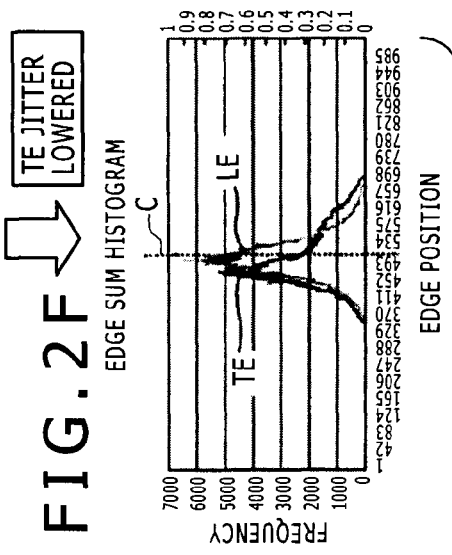
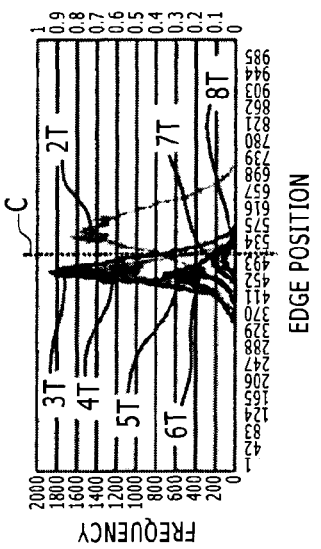
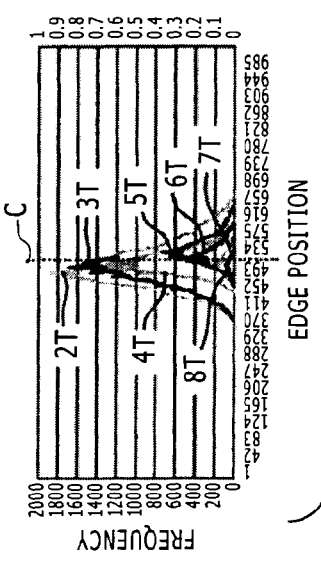

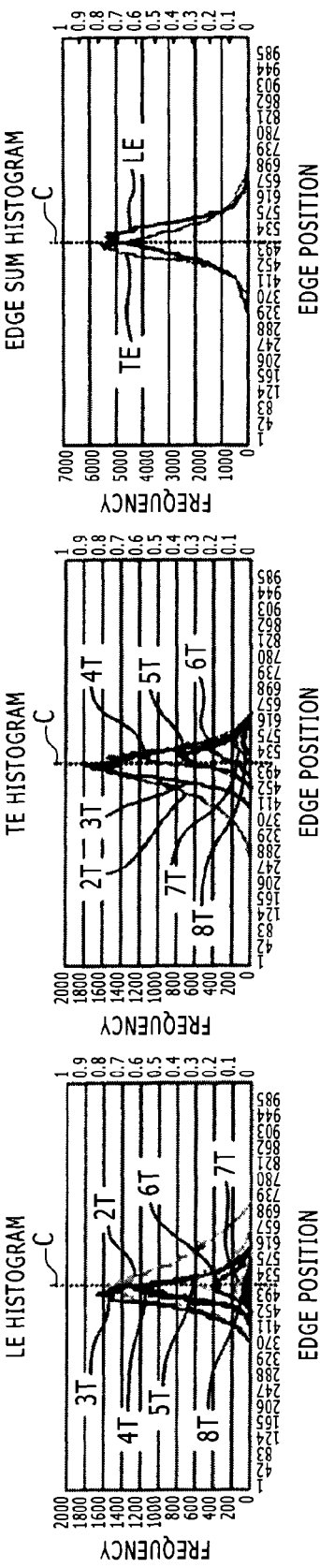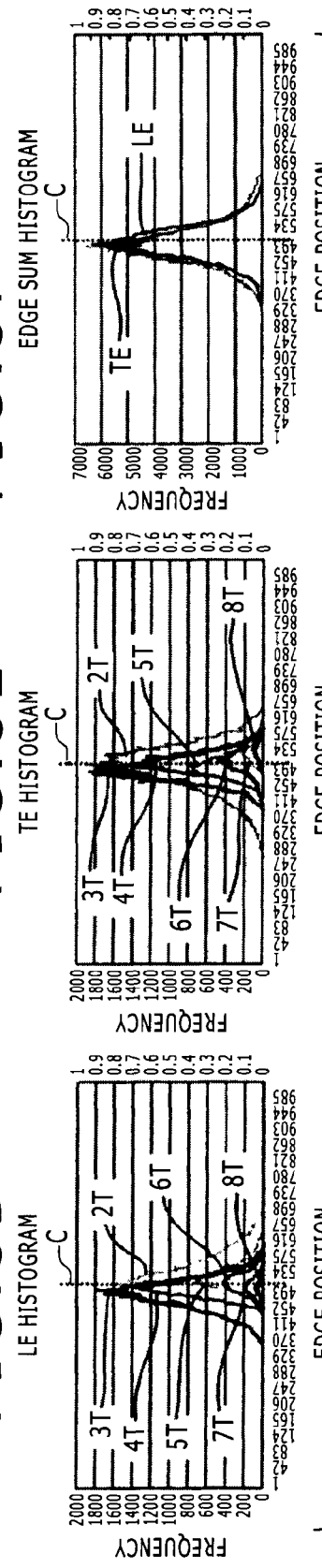

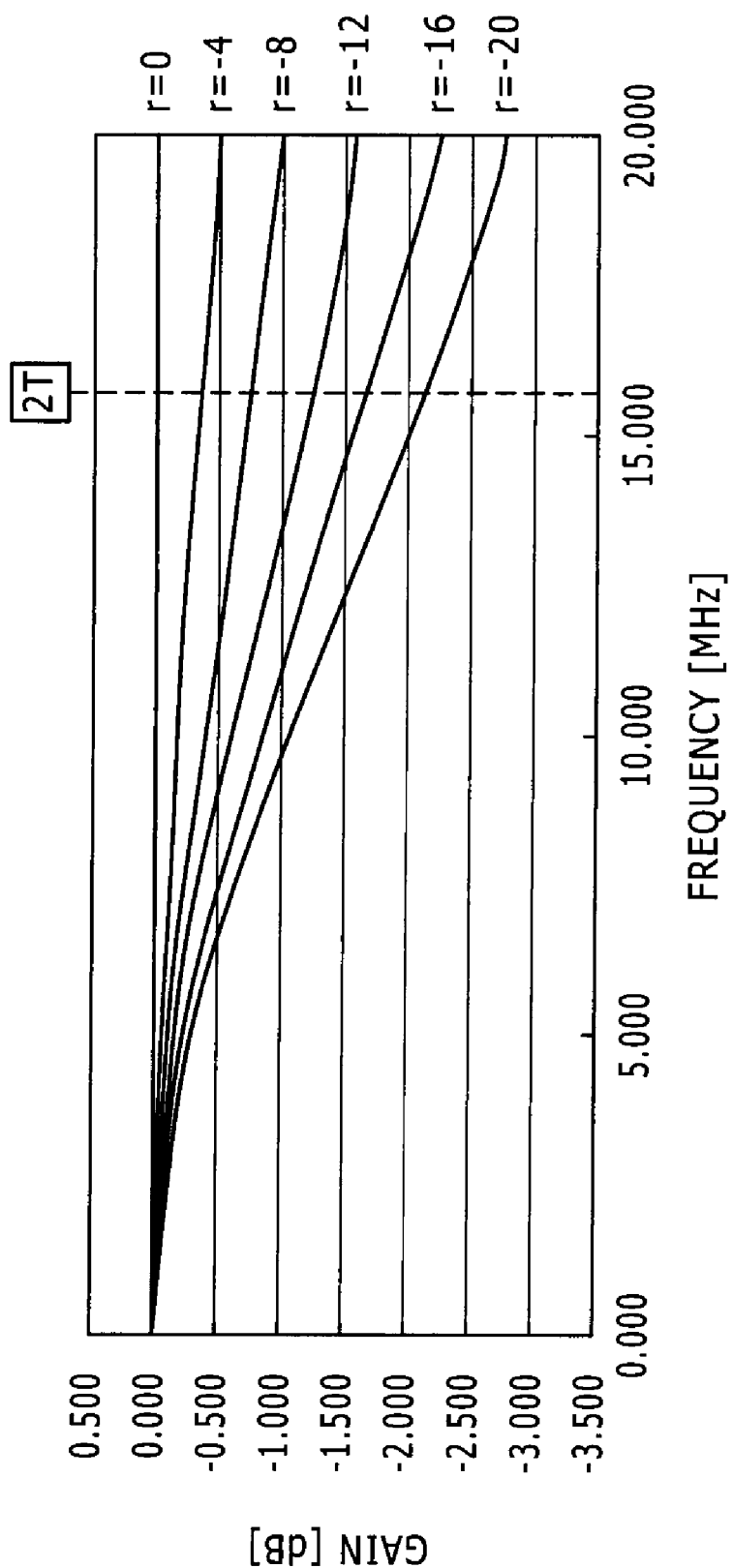

EVALUATION APPARATUS AND EVALUATION METHOD

BACKGROUND OF THE INVENTION

1. Field of the Invention

The present invention relates to an evaluation apparatus and an evaluation method for evaluating the signal quality of optical recording media.

2. Description of the Related Art

The quality of optical disk recording media (simply called optical disks hereunder) such as CD (Compact Disc), DVD (Digital Versatile Disc) and BD (Blu-ray Disc: registered trademark) has been evaluated using an indicator called jitter. Jitter is an indicator representing in terms of standard deviates the variance of the edge positions of pits formed on optical disks. More specifically, a plurality of edge positions of read signals from the optical disk are first detected. The results of the detection are then used to create a frequency distribution chart. From that chart, the standard deviates of the edge positions involved are calculated as jitter. The larger the jitter value thus calculated, the higher the variance of the edge positions is evaluated to be; the smaller the jitter, the lower the variance. That is, the smaller the jitter value, the higher the quality of the optical disk in question is evaluated to be, with its edge positions having low variance.

Generally, where a given optical disk product is evaluated for quality, a single evaluation apparatus (also called the measuring apparatus) will not be used on numerous optical disks to be evaluated. For timesaving purposes, a plurality of measuring apparatuses are used to divide the workload.

What is problematic here is that evaluation values vary reflecting the differences in optical characteristics between the measuring apparatuses involved. It is thus difficult to evaluate the quality of the target product based on a common standard. In particular, as disclosed by Japanese Patent Laid-Open No. 2009-123266 (hereinafter referred to as Patent Document 1), complicated differences in measurements can result from combinations of measuring apparatuses with optical disks during quality evaluation based on the above-mentioned jitter values.

One way of resolving the differences in measurements between measuring apparatuses is by selectively installing their optical systems that are found appreciably similar to one another in characteristics, whereby the variance in optical characteristics between the measuring apparatuses is reduced. With the variance of their optical characteristics thus reduced, the measuring apparatuses are supposed to minimize the differences in their measurements stemming from the combination with optical disks.

However, the selection of the optical systems is quite a troublesome task that can result in a significant increase in labor cost. Also, the attempt to choose from a large number of optical systems with their characteristics very similar to one another is an arduous exercise. For these reasons, the recourse to selecting the optical systems is not a practical option.

In order to resolve the problem of differences in measurement without selecting optical systems, techniques have been proposed which select beforehand a reference measuring apparatus from among a plurality of measuring apparatuses. Measurements taken by the other measuring apparatuses are then corrected to match those taken by the reference apparatus.

The proposed techniques illustratively include a first and a second method to be outlined hereunder. The first method involves using a correction coefficient obtained by the following primary expression:

$$y = ax + b$$

where "x" denotes the measured jitter value and "y" stands for the correction coefficient to be given to the measurements. That is, the primary expression above is used to approximate the correlativity of the differences in measurements between the reference measuring apparatus on the one hand and each of the other measuring apparatuses on the other hand. The correction coefficient obtained by means of the primary expression is then used to correct the measurements taken by each of the measuring apparatuses.

The second method is described in Patent Document 1. According to this method, the correlation of the differences in measurements is considered more complicated between the reference measuring apparatus and the other measuring apparatuses. The second method thus involves correcting the measurements taken by each of the measuring apparatuses using a correction coefficient acquired by means of a more complicated correlation function than before. More specifically, attention is drawn to a distortion of the frequency distribution of the edge positions on each measuring apparatus. Measurements are corrected using a correction coefficient calculated based on the direction of the distortion (i.e., polarity) and on the degree of the distortion.

SUMMARY OF THE INVENTION

However, the first method outlined above is a simplified correction technique that utilizes a primary expression. As such, the method involves performing easy arithmetic operations for correction but may provide a relatively low effect of reducing the variance of measurements (i.e., of lowering the deviation of the differences in measurements). The second method above offers a better effect of resolving the differences in measurements but involves carrying out more complicated arithmetic operations for correction purposes.

In any case, the techniques such as the first and the second methods above for correcting the results of evaluation (i.e., measurements) using the correction coefficient are not proposed as a countermeasure that would precisely identify the causes of the differences in measurements stemming in complex fashion from the combinations of measuring apparatuses with optical disks. With these existing techniques in use, some differences in measurements between measuring apparatuses are thus inevitable.

The present invention has been made in view of the above circumstances and provides arrangements for resolving the differences in measurements between measuring apparatuses without selecting their optical systems or correcting their measurements entailing complicated arithmetic operations.

In carrying out the present invention and according to an embodiment thereof, there is provided an evaluation apparatus including: a signal reading block configured to read a recorded signal from an optical recording medium through light irradiation thereto, the signal having been recorded by formation of pits on the medium; a first waveform equalization block configured to input a reproduced signal obtained by the signal reading block reading the recorded signal, so as to perform a waveform equalization process on the reproduced signal using equalization characteristics that vary the signal level of a short-waveform component of the reproduced signal intensively; a boundary detection block configured to detect a boundary between a waveform of pits and a waveform of lands from the reproduced signal; a selective output block configured selectively to output one of two signals based on a result of boundary detection performed by the boundary detection block, one of the two signals being the reproduced signal having undergone the waveform equalization process performed by the first waveform equalization block, the other signal being the reproduced signal not undergoing the waveform equalization process by the first waveform equalization block; and an evaluation value generation block configured to generate an evaluation value denoting a distribution of signal edge positions based on the reproduced signal output by the selective output block.

As will be discussed later, this applicant carried out experiments and studies on the differences in measurements stemming from combinations of measuring apparatuses (evaluation apparatuses) with optical recording media. As a result of the research, this applicant found that the differences in measurements stem from variations occurring in the length of the short-waveform component (e.g., 2T or 3T of BD (Blu-ray Disk: registered trademark)) in reproduced signals coming from the combination of measuring apparatuses with optical recording media.

It was confirmed that the variations in the length of the short-wavelength component result from differences between reproduced signals regarding pits in particular. More specifically, there exist measuring apparatuses that view the short pits such as 2T pits as longer or shorter than other apparatuses, and optical recording media with their short pits appearing longer or shorter than other media.

Where a plurality of measuring apparatuses are to be used to divide the task of measuring evaluation values of a plurality of optical recording media, the measuring apparatus that views the short pits as shorter than any other measuring apparatus does is assumed to be selected as a reference measuring apparatus (reference apparatus). In this case, when all measuring apparatuses take measurements of a given optical recording medium, the reference apparatus always views the short pits as shorter than any other apparatus does.

At this point, it is assumed that an optical recording medium with its short pits appearing longer than an appropriate value (M_sp_long) when measured by the reference apparatus is subjected to measurement and that the optical recording medium (M_sp_long) appears to have a measurement of $\alpha\_ref\_long$ when measured by the reference apparatus and a measurement of $\alpha\_ms\_long$ when measured by another measuring apparatus.

Since the reference apparatus views the short pits as shorter than any other apparatus does, the other measuring apparatus views the short pits as longer than the reference apparatus does. As a result, the measurement of $\alpha\_ms\_long$ taken by the other measuring apparatus is a lower value than the measurement of $\alpha\_ref\_long$ taken by the reference apparatus.

Meanwhile, it may be conversely assumed that an optical recording medium with its short pits appearing shorter than an appropriate value (M_sp_short) when measured by the reference apparatus is subjected to measurement and that the optical recording medium (M_sp_short) appears to have a measurement of $\alpha\_ref\_short$ when measured by the reference apparatus and a measurement of $\alpha\_ms\_short$ when measured by another measuring apparatus.

In that case, since the other measuring apparatus views the short pits as longer than the reference apparatus does, the short pits appearing shorter when viewed by the reference apparatus appear to have an appropriate length when viewed by the other measuring apparatus. As a result, the measurement of $\alpha\_ms\_short$ taken by the other measuring apparatus is a better value than the measurement of $\alpha\_ref\_short$ taken by the reference apparatus.

As described above, the short pits appear to be shorter or longer than a reference length from one measuring apparatus to another and from one optical recording medium to another.

From this phenomenon come the complicated differences in measurements: as shown in FIG. 6 of Patent Document 1 (or in FIG. 1 of this specification), one optical recording medium may present better values when measured by another measuring apparatus than by the reference apparatus; another optical recording medium may present lower values when measured by the reference apparatus than by another measuring apparatus.

To obtain appropriate evaluation values through the correction of such complicated differences in measurements, the length of the short pits need only be made to appear the same regardless of the variations in characteristics from one measuring apparatus to another or from one optical recording medium to another. In other words, the waveform of the short pits in reproduced signals from various measuring apparatuses need only be correct to become equivalent to the waveform acquired by the reference apparatus.

The correction outlined above is carried out by effecting waveform equalization in such a manner that the waveform of the short pits in reproduced signals from various measuring apparatuses becomes equivalent to the waveform obtained by the reference apparatus. This is accomplished by implementing the present invention illustratively as follows: a first waveform equalization process is performed as outlined above on the reproduced signal using equalization characteristics that vary the signal level of a short-waveform component of the reproduced signal intensively. Based on the result of detecting a boundary between a waveform of pits and a waveform of lands in the reproduced signal, one of two signals is selectively output, one signal being the reproduced signal having undergone the first waveform equalization process, the other signal being the reproduced signal not undergoing the first waveform equalization process. An evaluation value is then generated which denotes a distribution of signal edge positions based on the reproduced signal that has been output selectively.

The structure above permits correction in a manner that renders the waveform of the short pits obtained by various other measuring apparatus equivalent to the waveform acquired by the reference apparatus. As a result of the correction, the variance of measurements (i.e., differences in measurements) stemming from combinations of measuring apparatuses with optical recording media is eliminated so that quality evaluation is carried out appropriately.

According to another embodiment of the present invention, there is provided an evaluation method including the steps of: reading a recorded signal from an optical recording medium through light irradiation thereto, the signal having been recorded by formation of pits on the medium; inputting a reproduced signal obtained in the reading step reading the recorded signal, so as to perform a waveform equalization process on the reproduced signal using equalization characteristics that vary the signal level of a short-waveform component of the reproduced signal intensively; selectively outputting one of two signals based on a result of detecting a boundary between a waveform of pits and a waveform of lands from the reproduced signal, one of the two signals being the reproduced signal having undergone the waveform equalization process, the other signal being the reproduced signal not undergoing the first waveform equalization process; and generating an evaluation value denoting a distribution of signal edge positions based on the reproduced signal output in the selective output step.

According to the present invention, as outlined above, the waveform of short pits in particular on an optical recording medium measured by the reference apparatus and the corresponding waveform acquired by other measuring apparatuses are made equivalent through waveform equalization. The differences in measurements stemming from combinations of the measuring apparatuses with optical recording media are thus resolved and quality evaluation is performed properly.

As discussed above, the differences in measurements are attributable particularly to the variations of the short-pit lengths in the reproduced signal. Compared with the ordinary technique of adding a correction coefficient to measurements, the inventive scheme provides bull's-eye solution to the problem so that the differences in measurements are resolved more effectively than before.

Obviously, this invention presupposes the presence of variations in optical characteristics between measuring apparatuses. Consequently, there is no need to select optical systems for the measuring apparatuses.

Thus according to the present invention, the differences in measurements between measuring apparatuses are resolved so that quality evaluation is carried out properly, with no need to select optical systems for the measuring apparatuses or to correct the measurements through complicated arithmetic operations.

BRIEF DESCRIPTION OF THE DRAWINGS

FIGS. 2A through 2F are graphic representations showing frequency distributions of edge positions on optical disks belonging to group B (made up of optical disks whose jitter values are found lower when measured by other measuring apparatuses than by the reference apparatus) indicated in FIG. 1;

FIGS. 3A through 3F are graphic representations showing frequency distributions of edge positions on optical disks belonging to group A (made up of optical disks whose jitter values are found better when measured by other measuring apparatuses than by the reference apparatus) indicated in FIG. 1;

FIG. 4 is a graphic representation showing filter characteristics (frequency characteristics) with regard to various settings of a coefficient "r";

DETAILED DESCRIPTION OF THE PREFERRED EMBODIMENTS

The preferred embodiments of the present invention will now be described under the following headings:
<1. Causes that generate differences in measurements stemming from combinations of measuring apparatuses with disks>
<2. Technique of correcting differences in measurements as an embodiment of the present invention>
[2-1. Overview of the correction technique]
[2-2. Typical structure of the evaluation apparatus embodying the present invention]
[2-3. Effects of the correction]
[2-4. Summary of the embodiment]
<3. Variations>
<1. Causes that Generate Differences in Measurements Stemming from Combinations of Measuring Apparatuses with Disks>

Figure 1:
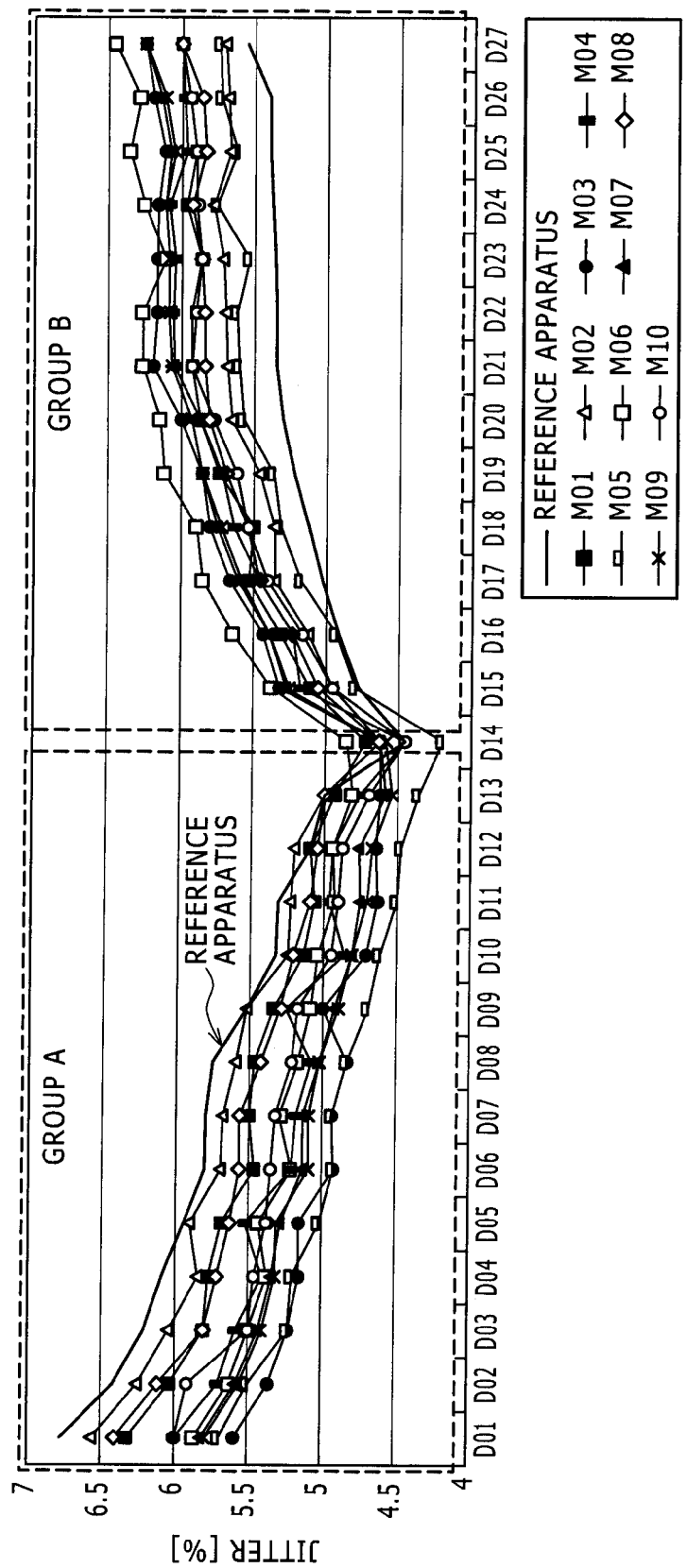
FIG. 1 is a graphic representation explanatory of how differences in measurements actually stem from combinations of measuring apparatuses with optical recording media.

Described below in reference to FIGS. 1 through 3F are the causes that generate differences in measurements stemming from combinations of measuring apparatuses with disks. This description will be followed by an explanation of the technique of correcting differences in measurements as an embodiment of the present invention. Described first in reference to FIG. 1 is how differences in measurements actually result from combinations of measuring apparatuses with optical recording media.

It should be noted here that "measurements" in the ensuing description will denote the measured evaluation values representing the distribution of signal edge positions (i.e., boundary timing between the waveform of pits and the waveform of lands). More specifically, in conjunction with the embodiments of this invention, the measurements will denote so-called jitter values. The apparatus taking measurements of evaluation values, known as the evaluation apparatus, will also be called the measuring apparatus.

FIG. 1 shows jitter values measured by the reference apparatus and other measuring apparatuses (M01 through M10) with regard to a plurality of optical disks D (D01 through D27). In FIG. 1, thick solid lines denote the measurements taken by the reference apparatus; thin lines with different marks indicate the measurements taken by the other measuring apparatuses. In FIG. 1, the optical disks D are BD-ROM (Blu-ray Disc (registered trademark) Read Only Memory) disks on which information is recorded by combinations of pits and lands.

Referring to FIG. 1, evaluation values (i.e., jitter values) of the multiple optical disks D are taken by the various measuring apparatuses. It will be noted that the measurements taken of each optical disk D differ from one measuring apparatus to another. It will also be noted that the differences in measurements taken by the measuring apparatuses other than the reference apparatus are not constant with each optical disk D; with a different optical disk D, the differences in measurements vary as well.

More specifically, in FIG. 1, two groups A and B of optical disks D are shown to exist: in group A, the measurements of the optical disks D are generally better (i.e., jitter values are small) when measured by the other measuring apparatuses than by the reference apparatus; in group B, the measurements of the optical disks D are generally lowered (i.e., jitter values are large) when measured by the other measuring apparatuses than by the reference apparatus. It should be noted here that in FIG. 1, a plurality of optical disks D (D01 through D27) are numbered so that the relations between group A and group B can be visually clarified.

As indicated by the results in FIG. 1, there exist complex differences in measurements stemming from combinations of measuring apparatuses with optical disks D. It will be appreciated that such differences in measurements will not be resolved properly by resorting to the above-described ordinary technique (first technique) of making up measurements using a single correction coefficient for variance correction.

This applicant conducted studies and experiments on differences in measurements (about edge positions) stemming from combinations of measuring apparatuses with optical disks D as mentioned above, and discovered their probable cause. Specifically, such differences were found attributable to the variations of the length of the short-waveform component (2T in particular on BD) in the reproduced signal, the variations being detected when different measuring apparatuses are combined with different optical disks D. It was also found that the variations of the length of the short-waveform component result from the differences in pits between reproduced signals.

There are two particular phenomena: there exist measuring apparatuses with which the lengths of the short pits such as 2T pits appear longer or shorter than norm, and there are optical recording media on which the lengths of the short pits appear longer or shorter than norm.

Suppose that a plurality of measuring apparatuses are used to divide the task of measuring evaluation values of a plurality of optical disks D and that the measuring apparatus determining the short pits to be shorter than any other measuring apparatus does is selected as the reference apparatus. In this case, when a given optical disk D is evaluated by the reference apparatus as well as by the other measuring apparatuses, the short pits are always found the shortest when measured by the reference apparatus.

Suppose now that an optical disk D (D_sp_long) with its short pits appearing longer than norm when measured by the reference apparatus is subject to measurement and that the measurement taken of this disk by the reference apparatus is represented by α_ref_long and the measurement of the same disk by the other measuring apparatuses is denoted by α_ms_long. In this case, since the short pits appear the shortest when measured by the reference apparatus, the short pits appear far longer than norm when measured by the other measuring apparatuses. As a result, the measurement α_ms_long taken by the other measuring apparatuses turns out to be lower than the measurement α_ref_long taken by the reference apparatus.

On the other hand, suppose that an optical disk D (D_sp_short) with its short pits appearing shorter than norm when measured by the reference apparatus is subject to measurement and that the measurement taken of this disk by the reference apparatus is represented by α_ref_short and the measurement of the same disk by the other measuring apparatuses is denoted by α_ms_short. In this case, since the short pits appear longer when measured by the other measuring apparatuses than when measured by the reference apparatus, the short pits appear to present an appropriate length when measured by the other measuring apparatuses. As a result, the measurement α_ms_short taken by the other measuring apparatuses in this case turns out to be better than the measurement α_ref_short taken by the reference apparatus.

From the principle outlined above comes the phenomenon illustrated in FIG. 1. That is, the measurements taken of a given optical disk D by the other measuring apparatuses turn out to be better than the measurements of the same disk taken by the reference apparatus. The measurements taken of another optical disk D by the other measuring apparatuses turn out to be lower than the measurements of the same disk taken by the reference apparatus.

It should be noted here that the jitter value represents the sum of the edge position distributions of all waveform components (i.e., all pit lengths) but that the frequency of incidence of the short-wavelength component constitutes as much as 30 percent, with some variations occurring depending on the optical disk standard. For this reason, the jitter value varies in a relatively significant manner depending on the variations in the length of the short-wavelength component.

FIGS. 2A through 3F are graphic representations visually indicating typical relations between the variations of the length of the short pits on the one hand and the differences in their measurements on the other hand. Specifically, FIGS. 2A through 3F are histograms (frequency distributions) obtained when the edge positions of a given optical disk D are measured by the reference apparatus as well as by the other measuring apparatuses. More specifically, FIGS. 2A through 2F are histograms of the edge positions measured of an optical disk D belonging to group B in FIG. 1 (i.e., optical disk D whose jitter values turn out to be lower when measured by the other measuring apparatuses than by the reference apparatus). FIGS. 3A through 3F are histograms of the edge positions measured of an optical disk D belonging to group A in FIG. 1 (i.e., optical disk D whose jitter values turn out to be better when measured by the other measuring apparatuses than by the reference apparatus).

FIGS. 2A and 3A are histograms of leading edges LE per pit length (2T through 8T) acquired by the reference apparatus for each the two groups; FIGS. 2B and 3B are histograms of trailing edges TE per pit length obtained by the reference apparatus for each of the two groups; and FIGS. 2C and 3C are histograms of leading edges LE and trailing edges TE acquired by the reference apparatus for all pit lengths (i.e., with no distinction of pit lengths). FIGS. 2E and 3E are histograms of leading edges LE per pit length (2T through 8T) acquired by the other measuring apparatuses for each the two groups; FIGS. 2F and 3F are histograms of trailing edges TE per pit length obtained by the other measuring apparatuses for each of the two groups; and FIGS. 2G and 3G are histograms of leading edges LE and trailing edges TE acquired by the other measuring apparatuses for all pit lengths (i.e., with no distinction of pit lengths).

The leading edge LE is an edge position transiting from a land to a pit. Conversely, the trailing edge TE is an edge position transiting from a pit to a land. In FIGS. 2A through 3F, the values indicated on the horizontal axis (of edge positions) are values obtained by dividing a 1T (T stands for a channel clock) interval into 1,024 equal parts. In the figures, a broken line C represents an appropriate edge position (ideal edge position).

It should be noted that the reference apparatus selected for the case above is one with which the short pits appear to be shorter than with any other measuring apparatus. It follows that the short pits appear to be longer when measured by the other measuring apparatuses than by the reference apparatus.

The reader's attention is now drawn to peak positions (average edge positions) in the frequency distributions of the short pits (especially 2T) shown in FIGS. 2A, 2B, 2D, 2E, 3A, 3B, 3D, and 3E. When measurements are taken of an optical disk D of group B (FIGS. 2A, 2B, 2D and 2E), the short pits are confirmed to be longer (i.e., as the interval between a leading edge LE and a trailing edge TE) than when measurements are taken of an optical disk D of group A (FIGS. 3A, 3B, 3D and 3E). From this, it will be further appreciated that the optical disk D of group B is a disk of which the short pits appear to be longer than norm and that the optical disk D of group A is one whose short pits appear to be shorter than norm.

References to FIGS. 2A, 2B, 2D and 2E reveal that the short pits appear to be longer when measured by the other measuring apparatuses than when measured by the reference apparatus. It follows that the optical disk D of group B of which the short pits appear to be longer than norm appears to have still longer short pits when measured by the other measuring apparatuses than by the reference apparatus. In this case, as indicated by a comparison between FIG. 2C and FIG.

2F, the jitter values measured by the other apparatuses tend to be lower than the values measured by the reference apparatus. That is, as discussed earlier, the optical disk D of group B tends to present lower jitter values when measured by the other measuring apparatuses than by the reference apparatus. In this case, as illustrated, the jitter values about the trailing edges TE in particular have the tendency of getting lower.

References to FIGS. 3A, 3D, 3B and 3E reveal that the short pits appear to be also longer when measured by the other measuring apparatuses than when measured by the reference apparatus. Since the optical disk D of group A is a disk of which the short pits appear to be shorter than norm as mentioned above, this disk appears to have the short pits of appropriate lengths when measured by the other measuring apparatuses; the disk appears to have the short pits shorter than norm when measured by the reference apparatus. Consequently, as indicated by a comparison between FIG. 3C and FIG. 3F, the jitter values measured by the other apparatuses tend to be better in this case than the values measured by the reference apparatus. It follows that as discussed above, the optical disk D of group A tends to present better jitter values when measured by the other measuring apparatuses than when measured by the reference apparatus. In this case, as illustrated, the jitter values about the trailing edges TE in particular have the tendency of getting better.

<2. Technique of Correcting Differences in Measurements as an Embodiment of the Present Invention>
[2-1. Overview of the Correction Technique]

As described, the short pits appear longer or shorter than norm from one measuring apparatus to another and from one optical disk D to another. Hence the phenomenon in which the differences in measurements occur in complicated fashion as illustrated in FIG. 1: one group of disks presents better measurements when measured by the other measuring apparatuses than by the reference apparatus, and another group of disks manifests lower measurements when measured by the reference apparatus than by the other measuring apparatuses.

In order to take appropriate measurements of evaluation values through the correction of such complicated differences in measurements, the short pits need only be made to appear the same in length regardless of the variations in characteristics from one measuring apparatus to another or from one optical recording medium to another. That is, each measuring apparatus need only be corrected to render the waveform of the short pits in the reproduced signal equivalent to the corresponding waveform obtained by the reference apparatus.

Under the circumstances explained above, waveform equalization is carried out according to an embodiment of the invention in such a manner that the waveform of the short pits in reproduced signals from various measuring apparatuses becomes equivalent to the waveform obtained by the reference apparatus.

The specific arrangements for implementing the correction of this invention are outlined below in reference to FIGS. 4 through 6. As has been understood from the above description, there are two important points in carrying out the inventive correction technique: equalize the waveform of the short-wavelength component in the reproduced signal intensively, and target mainly the pits for waveform equalization.

The length of the short-waveform component is significantly affected by the depths of the pits formed on the optical disk D while the length is virtually unaffected by the lands. For this reason, the pits are mainly targeted for waveform equalization. According to this embodiment of the invention, only the pits are subjected to the waveform equalization process; the lands are totally excluded from waveform equalization.

Illustratively, this embodiment utilizes a 5-tap FIR (Finite Impulse Response) filter such as one using the expression 1 below for intensive waveform equalization targeted for the short-waveform component:

$$-(\tfrac{1}{8})*r*Z0-(\tfrac{1}{2})*r*Z1+(1+1.25*r)*Z2-(\tfrac{1}{2})*r*Z3-(\tfrac{1}{8})*r*Z4 \quad \text{[Expression 1]}$$

The FIR filter represented by the filter function composed of the expression 1 above may have its equalization characteristics (frequency characteristics) established as desired by setting a coefficient "r" appropriately.

For this embodiment, the measuring apparatus by which the short pits are measured to be apparently the shortest is selected as the reference apparatus. It follows that the short pits appear to be longer than norm when measured by all other measuring apparatuses. In order to correct this situation, the filter characteristics are established in such a manner as to lower (i.e., attenuate) the level of the short-waveform component intensively thereby shortening the length of the short pits.

FIG. 4 shows typical filter characteristics in effect when the FIR filter represented by the filter function above is utilized. Specifically, FIG. 4 indicates the filter characteristic (frequency characteristic) with regard to each of the settings of the coefficient "r" (r=0, −4, −8, −12, −16, −20). As a rough guide, the frequency of the 2T signal in the case of BD (about 16 MHz) is indicated in FIG. 4. The 3T signal regarding BD is approximately 11 MHz.

With this embodiment, only the pits are subjected to the waveform equalization process whereby the level of the short-waveform component in the reproduced signal is attenuated intensively; the lands are excluded from waveform equalization.

More specifically, this embodiment involves establishing a first and a second filter in parallel as waveform equalization filters to which a reproduced signal is input. The first filter performs a waveform equalization process entailing suitable attenuation characteristics in which the coefficient "r" is other than zero. The second filter has the coefficient "r" set to zero so that the short-waveform component will not be attenuated. The embodiment additionally includes a boundary detection block for detecting the boundary between pits and lands in the reproduced signal. Based on a result of the boundary detection performed by the boundary detection block, either the reproduced signal having passed through the first filter or the reproduced signal past the second filter is output selectively.

In this manner, it is possible to acquire the reproduced signal of which the level of the short-waveform component is attenuated intensively by targeting solely the pits. These arrangements constitute a structure whereby the level of the short pits in the reproduced signal is attenuated in an intensive manner.

The waveform equalizer installed in ordinary evaluation apparatuses does not perform such selective waveform equalization. That waveform equalizer is rather a linear equalizer that establishes the same coefficient "r" for both pits and lands. Generally, the fact that jitter measurements are not properly corrected by the waveform equalizer varying its coefficient inside an optical disk evaluation apparatus is attributable to the use of such a linear waveform equalizer.

Figure 5:
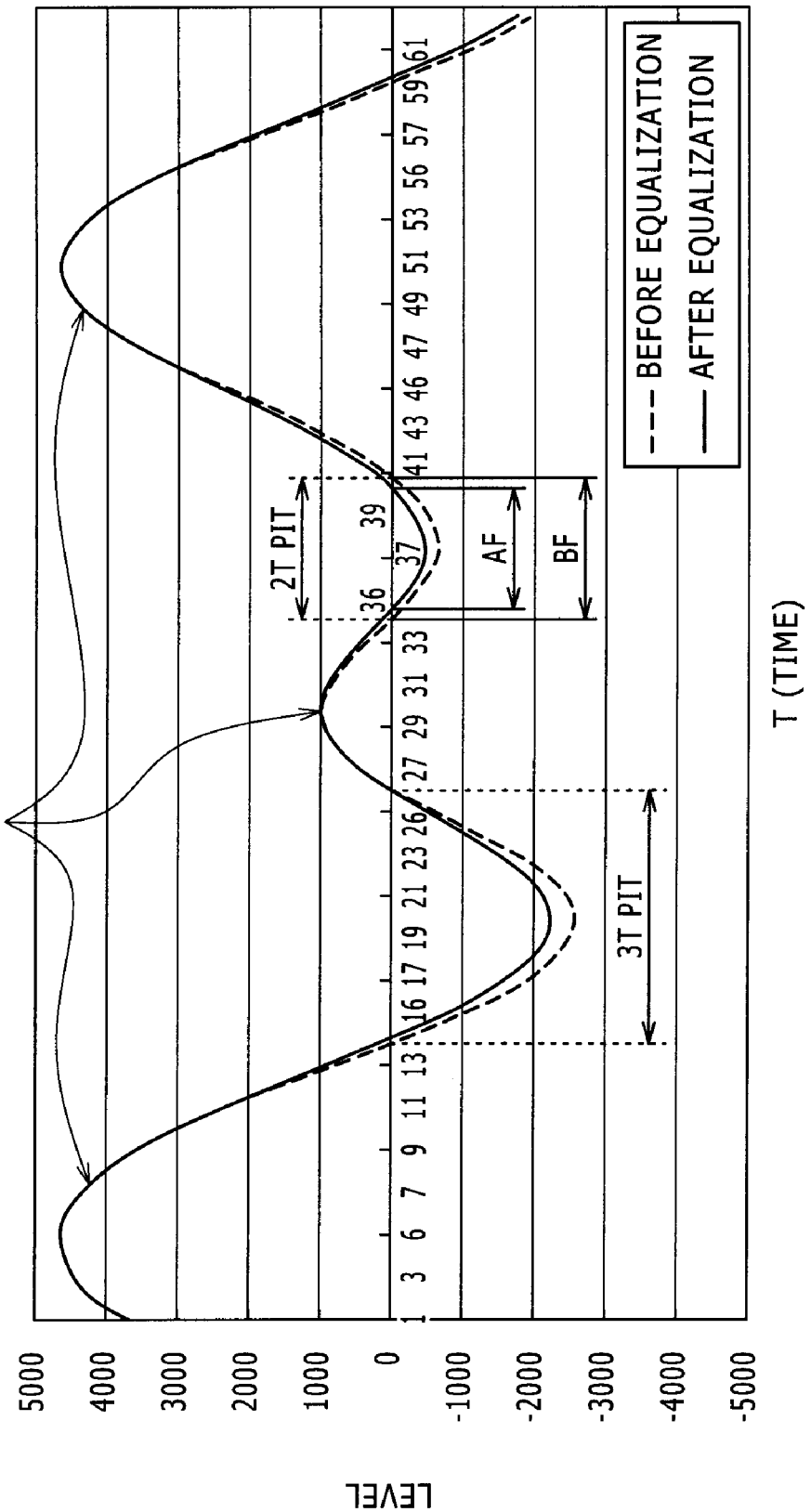
FIG. 5 is a graphic representation explanatory of typical effects exerted by a waveform equalization process as an embodiment of the present invention.

FIG. 5 is a graphic representation explanatory of the effects of the waveform equalization process performed by this embodiment. Specifically, FIG. 5 shows results of how the waveform of the reproduced signal before equalization (indicated by broken line) and the waveform of the reproduced signal after equalization (indicated by solid line) are simulated using the filter function established by the expression 1 above, with the coefficient "r" set to "−16" for the first filter (i.e., on the pit side) and to "0" for the second filter (i.e., on the land side).

As is understood from FIG. 5, the level of the lands remains unchanged when this embodiment utilizes the waveform equalizer performing the above-described selective waveform equalization. With regard to the pits, it can be seen that the levels of the short pits such as 3T and 2T pits are lowered intensively as illustrated. Where the filter function is arranged to contain the settings based on the expression 1 above, it is confirmed that the intensive declines of the levels of the short pits result in the shortening of mainly the 2T pits (in the figure, compare the length of the 2T pits before equalization (BF) with the length of the 2T pits after equalization (AF) for reference).

In resolving the differences in measurements between the measuring apparatuses involved, the coefficient "r" is set so as to make the lengths of the short pits obtained by the other measuring apparatuses coincide with the length of the short pits acquired by the reference apparatus. As is understood from FIG. 1 showing differences in measurements taken by the reference apparatus as well as by the other measuring apparatuses, the length of the short pits measured by each measuring apparatus is different from the short pit length obtained by the reference apparatus. For this reason, in order to make the length of the short pits measured by various measuring apparatuses coincide with the short pit length measured by the reference apparatus, the coefficient "r" suitable for each of the measuring apparatuses needs to be determined.

Figure 6:
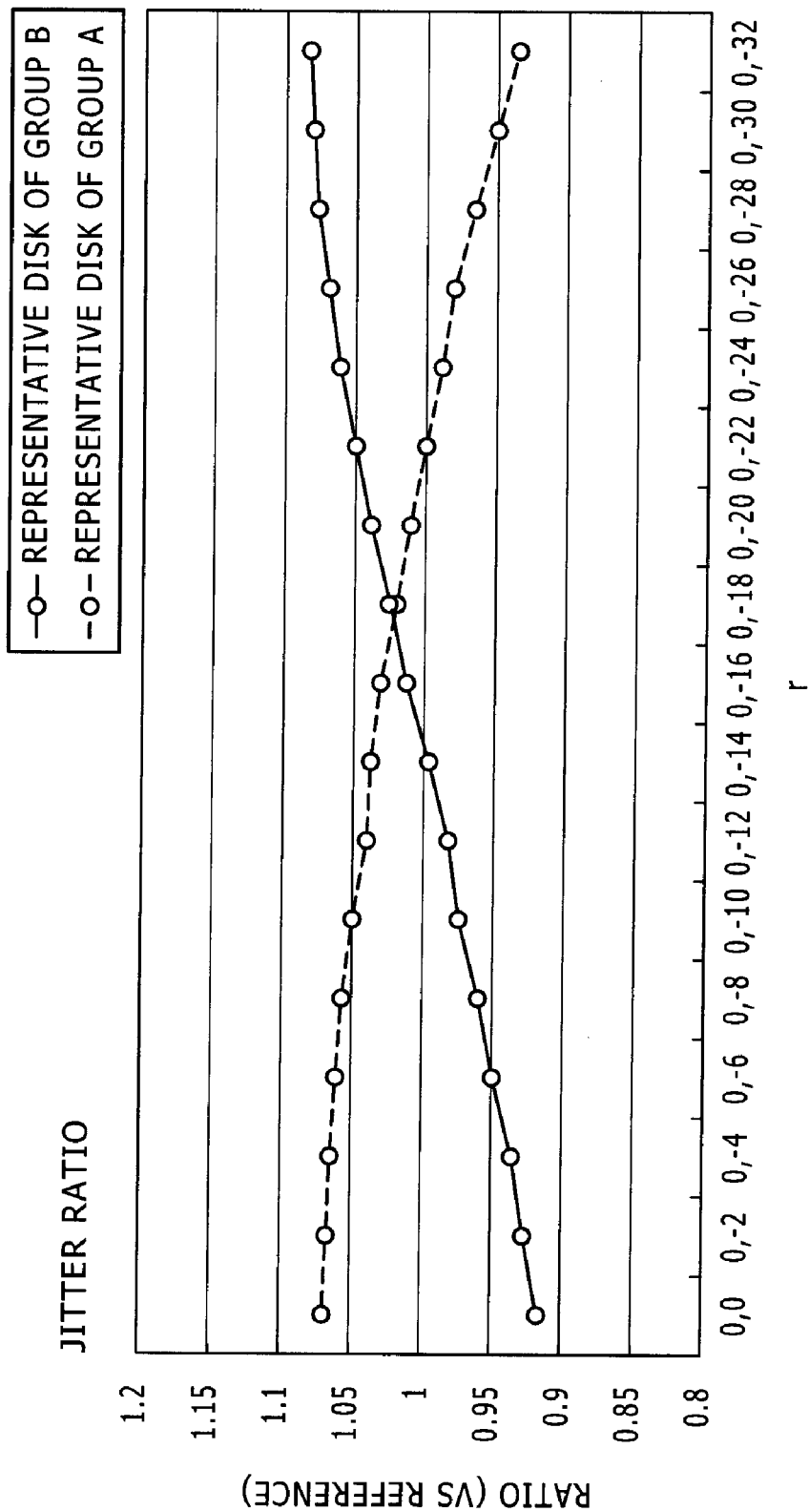
FIG. 6 is a graphic representation explanatory of a typical technique of selecting the coefficient "r"

FIG. 6 is a graphic representation explanatory of a typical technique of determining the coefficient "r" for each measuring apparatus. In determining the coefficient "r," a disk representative of group A and a disk representing group B are first selected from among a plurality of optical disks D (D01 through D27 in FIG. 1). Each measuring apparatus for which the coefficient "r" has been determined is then used to measure jitter values of the representative disks of the two groups, with the coefficient "r" varied from one measuring apparatus to another.

The jitter measurements taken of the disk representative of group A by each target measuring apparatus using each of the varying settings of the coefficient value "r" are compared with the jitter measurements taken of the representative disk of group A by the reference apparatus. From the comparison, the ratio of the jitter measurements taken by the reference apparatus to the jitter measurements taken by each target measuring apparatus is obtained regarding the disk representative of group A (i.e., ratio of reference apparatus to target measuring apparatus).

Likewise, the jitter measurements taken of the disk representative of group B by each target measuring apparatus using each of the varying settings of the coefficient value "r" are compared with the jitter measurements taken of the representative disk of group B by the reference apparatus. From the comparison, the ratio of the jitter measurements taken by the reference apparatus to the jitter measurements taken by each target measuring apparatus is obtained regarding the disk representative of group B (i.e., ratio of reference apparatus to target measuring apparatus).

FIG. 6 plots the ratios of the jitter values obtained by the reference apparatus to the jitter values acquired by each target measuring apparatus using the corresponding coefficient "r" with regard to the disk representative of group A and the disk representing group B. As illustrated in FIG. 6, a broken line denotes transitions of the ratios corresponding to the varying coefficient "r" regarding the disk representative of group A, while a solid line indicates transitions of the ratios corresponding to the varying coefficient "r" with respect to the disk representing group B. In this case, the values of the coefficient "r" on the upper level of the horizontal axis represent the settings for the first filter mentioned above, and the values of the coefficient "r" on the lower level of the horizontal axis denote the settings for the second filter.

As illustrated, when the value of the coefficient "r" for the first filter is "0" (i.e., no correction performed), the ratio of the jitter values obtained by the reference apparatus to the jitter values obtained by the target measuring apparatus with regard to the disk representative of group A is larger than the ratio of the jitter values acquired by the reference apparatus to the jitter values acquired by the target measuring apparatus regarding the disk representing group B. That is because group A is a group of disks of which the jitter values appear to be smaller when measured by the other measuring apparatuses than by the reference apparatus whereas group B is a group of disks whose jitter values appear larger when measured by the other measuring apparatuses than by the reference apparatus (see FIG. 1).

As the absolute value of the coefficient "r" for the first filter becomes larger, the reference apparatus-to-target measuring apparatus jitter ratio regarding the disk representative of group A gradually approaches the reference apparatus-to-target measuring apparatus jitter ratio with regard to the disk representing group B, as illustrated.

The point where the two ratios coincide is a point at which the measurements taken by the reference apparatus and the measurements taken by the target measuring apparatus indicate the same tendency regarding the respective optical disks D having different characteristics. The value of the coefficient "r" in effect at this point is selected as the value of the coefficient "r" to be set for the target measuring apparatus. In the example of FIG. 6, "r=−18" is the coefficient "r" to be set on the pit side for the target measuring apparatus.

What was described above is the typical technique of determining the value of the coefficient "r" to be established beforehand for each of the measuring apparatuses involved. After the coefficient "r" thus determined is set for each measuring apparatus, actual jitter is measured by the apparatus in question. This makes it possible to perform waveform equalization in a manner making the length of the short pits measured by each measuring apparatus coincide with the length of the short pits measured by the reference apparatus. As a result, the differences in measurements between the measuring apparatuses involved are corrected, and appropriate evaluation values are obtained.

[2-2. Typical Structure of the Evaluation Apparatus Embodying the Present Invention]

Figure 7:
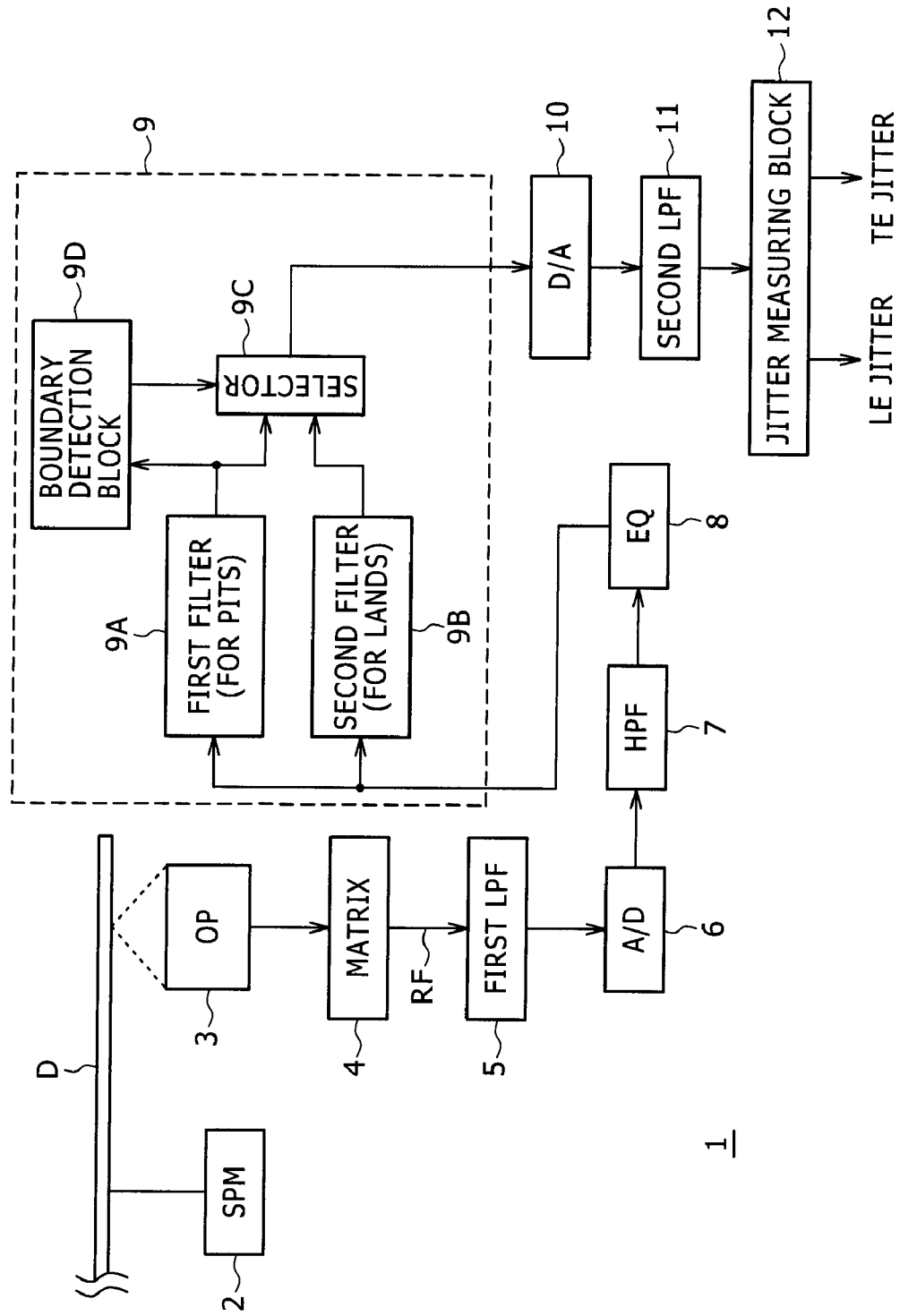
FIG. 7 is a block diagram showing an internal structure of an evaluation apparatus embodying the present invention.

Explained below in reference to FIG. 7 is a typical structure of an evaluation apparatus (evaluation apparatus 1) for implementing the correction technique discussed in the foregoing description. Referring to FIG. 7, an optical disk D is loaded into the evaluation apparatus 1, placed on a turntable (not shown), and driven rotatively by a spindle motor (SPM) 2 illustratively at a constant linear velocity (CLV).

From the rotatively driven optical disk D, a signal is read by an optical pickup (OP) 3. Although not shown, the optical pickup 3 incorporates a laser diode, a photo-detector, an object lens, and an optical system. The laser diode works as a source of a laser beam. The photo-detector detects reflected light coming from the disk. The object lens serves as an edge from which the laser beam is irradiated. The optical system causes the laser beam to be emitted to the recording surface of the disk through the object lens, and leads the reflected light therefrom into the photo-detector.

Also in the optical pickup 3, the object lens is retained by a dual-axis mechanism movably in the tracking and focusing directions. The object lens is further held by a sled mechanism movably in the radial direction of the optical disk D.

Information of the reflected light coming from the optical disk D is detected by the photo-detector. The detected information is translated into an electrical signal representing the amount of the light received. The electrical signal is sent from the optical pickup 3 to a matrix circuit 4 shown in FIG. 7.

The matrix circuit 4 includes a current voltage conversion circuit and a matrix operation/amplification circuit for dealing with output currents from a plurality of light-receiving elements making up the photo-detector. Illustratively, the matrix circuit 4 generates a radio frequency signal (RF) corresponding to the reproduced signal derived from the signal recorded on the optical disk D, as well as a focus error signal and a tracking error signal for servo control purposes.

The focus error signal and tracking error signal are fed to a servo circuit, not shown. The servo circuit controls the dual-axis mechanism in operation inside the optical pickup 3 in keeping with the error signals thus supplied, whereby diverse servo controls such as focus servo control and tracking servo control are implemented.

The reproduced signal RF output from the matrix circuit 4 is digitally sampled by an A/D converter 6 via a first low-pass filter (LPF) 5. The sampled signal is fed to a high-pass filter (HPF) 7 for low-cut filtering. The low-cut filtering process performed by the high-pass filter 7 makes adjustments so that the boundary level between pits and lands in the reproduced signal RF becomes practically zero.

The reproduced signal RF past the high-pass filter 7 is supplied to an equalizer (EQ) 8. This equalizer 8 is used for intersymbol interference elimination. The equalizer 8 is thus well known as a so-called conventional EQ.

After going through the equalization process by the equalizer 8 for intersymbol interference elimination, the reproduced signal RF is sent to a short-pit intensive correction block 9 for a waveform equalization process whereby the level of the short-pit component is attenuated intensively. Past the waveform equalization process, the reproduced signal RF is converted to an analog signal by a D/A converter 10. The reproduced signal RF in analog form is sent to a jitter measurement block 12 via a second low-pass filter 11.

The jitter measurement block 12 measures (i.e., calculates) a jitter value about leading edges LE (LE jitter) and a jitter value about trailing edges TE (TE jitter) based on the reproduced signal RF input through the second low-pass filter 11.

In FIG. 7, the short-pit intensive correction block 9 is shown to include a first filter 9A, a second filter 9B, a selector 9C, and a boundary detection block 9D as illustrated. The reproduced signal RF output from the equalizer 8 is input to the first filter 9A and second filter 9B as shown.

The first filter 9A corresponds to the above-described first filter. In this setup, the first filter 9A is a 5-tap FIR filter that utilizes the above expression 1. The coefficient "r" is established beforehand on the first filter 9A as explained above in reference to FIG. 6. Waveform equalization is carried out in a manner that intensively attenuates the level of the short-waveform component in the reproduced signal RF.

The second filter 9B corresponds to the above-described second filter. In this setup, the second filter 9B is a 5-tap FIR filter like the first filter 9A. As explained above, the level on the land side is kept unchanged by this embodiment. Thus the coefficient "r" to be set on the second filter 9B is determined to be "0." If waveform equalization is desired to be effected on the land side as well, the coefficient "r" may be determined to be other than "0," as long as the level attenuation effect with the second filter 9B remains less than with the first filter 9A.

The reproduced signal RF past the first filter 9A and second filter 9B is fed to the selector 9C. In this case, the reproduced signal RF past the first filter 9A is also branched to the boundary detection signal 9D.

Given the reproduced signal RF from the first filter 9A, the boundary detection block 9D detects a boundary position between pits and lands in that reproduced signal RF. More specifically, the boundary position is determined by detecting the point at which the polarity of the value of the reproduced signal RF coming from the first filter 9A is changed when the boundary level is adjusted to "0" by the high-pass filter 7 as described above.

The selector 9C selectively outputs either the output from the first filter 9A or the output from the second filter 9B based on the result of the boundary detection by the boundary detection block 9D. More specifically, given an indication that the boundary position transiting from a land to a pit is detected as the result of the boundary detection by the boundary detection block 9D, the selector 9C switches its output to the reproduced signal RF past the first filter 9A. If given an indication that the boundary position transiting from a pit to a land is detected as the result of the boundary detection by the boundary detection block 9D, the selector 9C switches its output to the reproduced signal RF past the second filter 9B.

The short-pit intensive correction block 9 is structured as has been described above. This structure intensively corrects (i.e., attenuates in this case) the level of the short pits in the reproduced signal RF.

[2-3. Effects of the Correction]

Figure 8B:
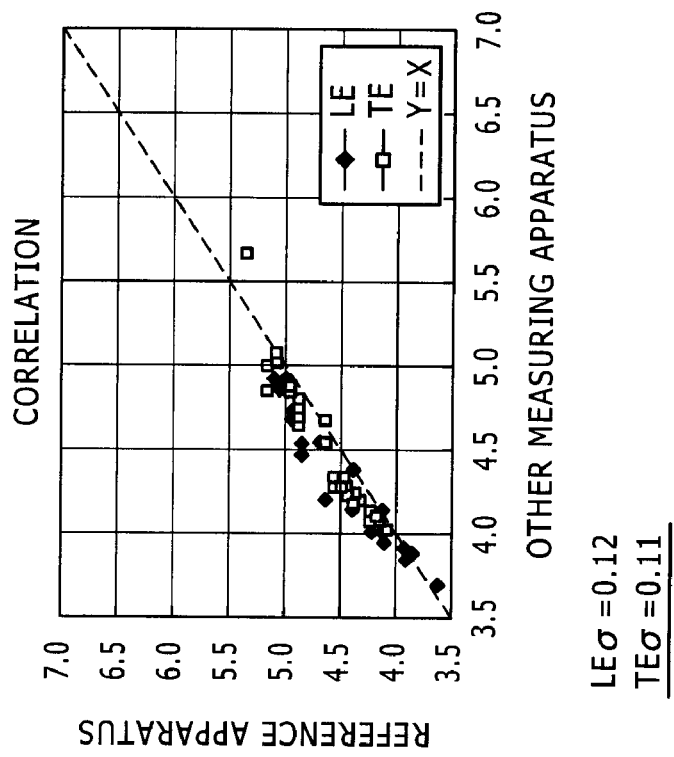
FIGS. 8A and 8B are graphic representations demonstrating the effects acquired through the correction performed by the embodiment of the present invention.
Figure 8A:
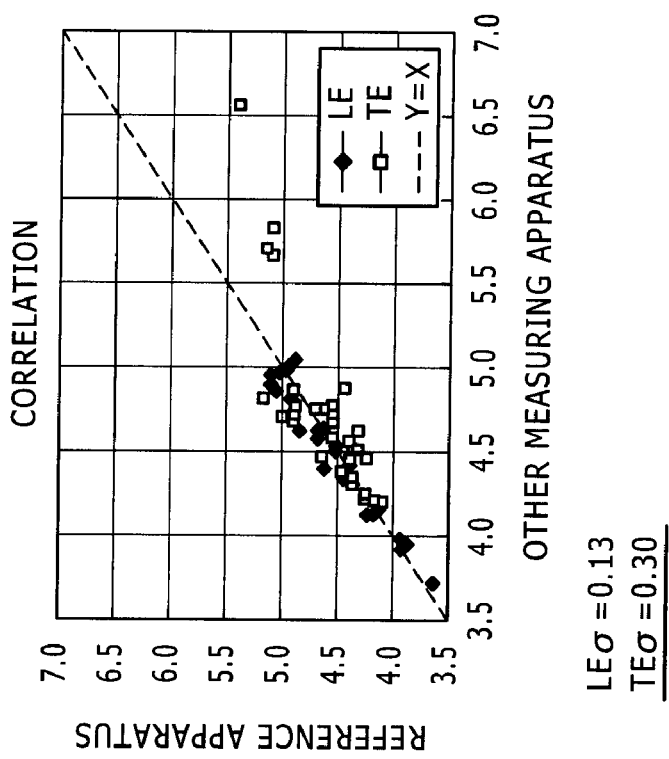

FIGS. 8A and 8B are graphic representations demonstrating the effects acquired through the correction performed by the embodiment of the present invention. FIG. 8A shows a typical correlation between the measurements taken by the reference apparatus and the measurements taken by other measuring apparatuses in a case with no correction, presented here for comparison purposes (i.e., the correction according to the invention is not performed). FIG. 8B indicates a typical correlation between the measurements taken by the reference apparatus and the measurements taken by other measuring apparatuses where the inventive correction (which embodies the present invention) is carried out.

Each of FIGS. 8A and 8B shows the correlation between the jitter values of leading edges LE taken of a plurality of optical disks D by the reference apparatus as well as by other measuring apparatuses, and the correlation between the jitter values of trailing edges TE taken of the multiple optical disks D by the reference apparatus as well as by the other measuring apparatuses. In these figures, the vertical axis denotes the measurements taken by the reference apparatus, and the horizontal axis represents the measurements taken by the other measuring apparatuses. With regard to each of the optical disks D, the measurements of leading edges LE taken by the reference apparatus as well as by the other measuring apparatuses are plotted using lozenge marks, and the measurements of trailing edges TE taken by the reference apparatus as well as by the other measuring apparatuses are plotted using rectangular marks in the figures.

In FIGS. 8A and 8B, the closer the plotted points to a Y=X line illustrated, the higher the correlation between the reference apparatus and the other measuring apparatuses (i.e., the smaller the differences in measurements therebetween).

Comparing FIG. 8A with FIG. 8B reveals the following: that in the case of FIG. 8A with no correction, there exist relatively large difference between the measurements of trailing edges TE; and that in the case of FIG. 8B where the inventive correction is carried out, the differences are shown to be largely corrected, with the differences between the jitter measurements of trailing edges TE virtually eliminated in particular.

According to calculations, the standard deviation LEσ for the jitter value of leading edges LE is 0.13 with no correction, and the standard deviation TEσ for the jitter value of trailing edges TE is 0.30 also with no correction. Where the inventive correction is carried out, by contrast, LEσ is 0.12 and TEσ is 0.11. These are significant improvements in the measurements of both leading ledges LE and trailing edges TE.

[2-4. Summary of the Embodiment]

As has been understood from the foregoing description, waveform equalization is performed by the embodiment of the invention in such a manner that the level (length) of the short pits in the reproduced signal from the reference apparatus becomes equivalent to the level of the short pits in the reproduced signal from the other measuring apparatuses. This resolves the differences in measurements stemming from combinations of measuring apparatuses with optical disks D, whereby quality evaluation is carried out properly.

According to the embodiment of the present invention, the differences in measurements are eliminated by correcting the levels of the reproduced signal. The inventive technique thus provides a bull's-eye solution to the cause that triggers measurement differences in practice, as opposed to the ordinary technique of adding a correction coefficient to the measurements taken. As a result, the technique of this invention resolves the differences in measurements more effectively than before.

Needless to say, the technique embodying the present invention presupposes the presence of variations in optical characteristics between the measuring apparatuses involved. That means there is no need to select optical systems for the measuring apparatuses.

The major features of the invention described above thus make it possible to implement appropriate quality evaluation by resolving the differences in measurements between measuring apparatuses with no need to correct the measurements through the selection of optical systems for the measuring apparatuses or through the execution of complicated arithmetic operations.

<3. Variations>

Although the description above contains many specificities, these should not be construed as limiting the scope of the invention but as merely providing illustrations of some of the presently preferred embodiments of this invention. For example, although not mentioned so far, the differences between the measurements taken by the reference apparatus and those taken by other measuring apparatuses may vary depending on, say, the recording layer of a multilayer optical disk D having a plurality of recording layers. The differences in the measurements between the reference apparatus and other measuring apparatuses may also vary depending on the speed of reproduction (read speed: ×1, ×2, ×4, ×8, etc.) in effect.

With these aspects taken into account, the coefficient "r" to be set for each measuring apparatus may be determined in advance with regard to each of different measurement conditions such as different recording layers or different read speeds. Each of such values of the coefficient "r" may be established selectively depending on the measurement conditions in effect.

Figure 9:
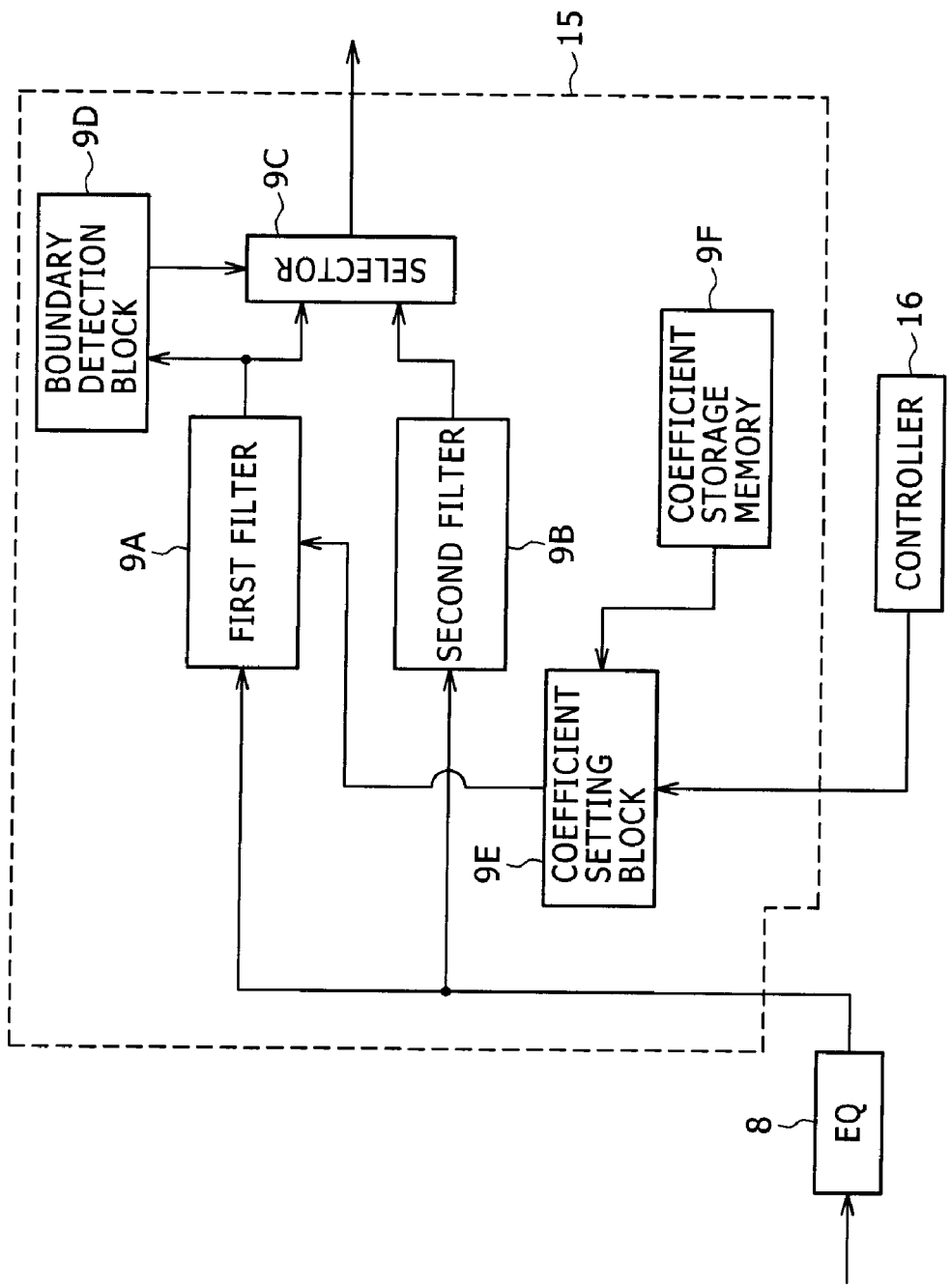
FIG. 9 is a block diagram explanatory of a typical structure of another evaluation apparatus as a variation of the present invention.

FIG. 9 is a block diagram explanatory of a typical structure of the evaluation apparatus as a variation of the present invention. This apparatus is arranged to set selectively the value of the coefficient "r" according to each of the different measurement conditions envisaged such as different recording layers or different read speeds.

The internal structure of the evaluation apparatus shown in FIG. 9 as a variation of the invention is primarily constituted by the components related to the intensive correction of short pits; the other components of the apparatus are similar to those in FIG. 7 and thus not shown. Of the component parts in FIG. 9, those already shown in FIG. 7 are designated by like reference numerals and their descriptions are omitted where redundant.

As can be seen from FIG. 9, this evaluation apparatus includes a short-pit intensive correction block 15 replacing the short-pit intensive correction block 9 held by the evaluation apparatus 1 in FIG. 7. The short-pit intensive correction block 15 contains a coefficient setting block 9E and a coefficient storage memory 9F in addition to the first filter 9A, second filter 9B, selector 9C, and boundary detection block 9D which are indicated in FIG. 7.

The coefficient storage memory 9F stores the values of the coefficient "r" determined in advance for each of diverse measurement conditions such as different recording layers or different read speeds. From a plurality of coefficient values "r" held in the coefficient storage memory 9F, the coefficient setting block 9E selects the coefficient "r" corresponding to instructions coming from a controller 16 shown in FIG. 9. The coefficient setting block 9E proceeds to set the selected coefficient value "r" on the first filter 9A.

The controller 16 is illustratively a microcomputer that controls the evaluation apparatus as a whole. In accordance with predetermined measurement conditions such as a specific recording layer from which to reproduce signals or the read speed in effect, the controller 16 instructs the coefficient setting block 9E which coefficient value "r" to select from among the coefficient values "r" held in the coefficient storage memory 9F.

The above-described evaluation apparatus as a variation of the embodiment offers the benefit of performing quality evaluation properly even when the differences between measurements taken by the reference apparatus and those taken by other measuring apparatuses vary depending on different measurement conditions such as different recording layers or different read speeds.

FIG. 9 shows a structure in which the coefficient "r" only for the first filter 9A is changed in keeping with the measurement condition in effect. Alternatively, the evaluation apparatus may be structured so that the coefficient "r" for the second filter 9B is also changed in accordance with the measurement condition in effect.

In the foregoing description, waveform equalization was shown to be conducted selectively on the signal from the pit side, with the first filter 9A and second filter 9B arranged to have one of their outputs selected depending on the result of the boundary detection. Alternatively, where no waveform equalization is performed on the signal from the land side as in the embodiment discussed above, the second filter 9B may be omitted, and the reproduced signal RF input to the first filter 9A (i.e., output signal from the equalizer 8 in the cases of FIGS. 7 and 9) may be branched into the selector 9C. This arrangement permits selective waveform equalization only on the signal from the pit side.

In that case, the reproduced signal RF input to the selector 9C without passing the first filter 9A (i.e., reproduced signal RF input directly from the equalizer 8 to the selector 9C) obviously needs to be delayed by the amount of time required for the equalization process of the first filter 9A. This arrangement is intended to provide chronological consistency to the output of the selector 9C.

The technique of determining the coefficient "r" is not limited to what was discussed above. Although it was explained above that one disk is selected to represent each of groups A and B, it is also possible to select a plurality of disks representative of each of the groups. With regard to each group of disks representing each group, the coefficient "r" may be obtained in such a manner that the reference apparatus-to-target measuring apparatus jitter ratios coincide with one another among the disks. These coefficient values "r" may then be averaged to determine the coefficient "r" to be established. Many other techniques may be adopted alternatively to determine the coefficient "r."

In connection with determination of the coefficient "r," it should be noted that for the above embodiment, the measuring apparatus by which the short pits are measured to be apparently the shortest is selected as the reference apparatus. The other measuring apparatuses are thus set with equalization characteristics for attenuating the level of the short pits (i.e., negative coefficient values "r" are established for these apparatuses). Alternatively, the measuring apparatus by which the short pits are measured to be apparently the longest or just in the middle may be selected as the reference apparatus. Then the coefficient value "r" (including its sign) may be suitably determined and established in keeping with the characteristics of the selected reference apparatus.

The filter function is not limited to what was shown in the expression 1 above. A suitable filter function may be otherwise established as needed for the actual embodiment to be implemented.

In the foregoing description, the short-pit intensive correction block (the block that performs intensive waveform equalization selectively on the short-waveform component on the pit side) was shown to be located immediately downstream of the equalizer 8 for intersymbol interference elimination. Alternatively, the short-pit intensive correction block may be located anywhere as long as it comes downstream of the A/D conversion of the reproduced signal RF.

Still, it is preferred to input the reproduced signal through a location where the short-pit level is maximized. With this aspect taken into account, the short-pit intensive correction block may be located at least downstream of the equalizer 8 for intersymbol interference elimination.

In the foregoing description, the boundary detection was shown to be performed on the basis of the reproduced signal RF having undergone the waveform equalization carried out by the first filter that changes the level of the short-waveform component intensively. Alternatively, the boundary detection may be conducted on the basis of the reproduced signal RF yet to undergo such intensive waveform equalization. In this case, it is mandatory to let the reproduced signal RF input to the boundary detection block be delayed by the amount of time required for the waveform equalization process.

If it is necessary to perform boundary detection based on the reproduced signal RF before the intensive waveform equalization of the short-waveform component while delaying the input signal to the boundary detection block, the first filter should preferably be an FIR filter. If an IIR (Infinite Impulse Response) filter were to be used as the first filter, the delay time would have to be changed in keeping with the frequency of the input signal because the time required for the equalization process varies with the frequency of the input signal (i.e., reproduced signal). As long as a symmetric FIR filter (fixed delay type) is utilized, there is no need to change the delay time so that the structure of the apparatus may be simplified accordingly.

In the foregoing description, with the pit-to-land boundary level of the reproduced signal RF adjusted to zero, the boundary detection was shown to be carried out upon detection of the point at which the polarity of the reproduced signal RF is changed. Alternatively, a midpoint level may be obtained from the peak and bottom levels detected of the reproduced signal RF, and the midpoint level may be used as a threshold value for boundary detection. As another alternative, even after the boundary level is adjusted to zero, the boundary detection may be performed using as its threshold value a midpoint level between the peak and the bottom of the shortest wavelength, whereby the accuracy of the boundary detection is improved.

The present application contains subject matter related to that disclosed in Japanese Priority Patent Application JP 2009-246555 filed in the Japan Patent Office on Oct. 27, 2009, the entire content of which is hereby incorporated by reference.

It is thus evident that many alternatives, modifications and variations will become apparent to those skilled in the art in light of the foregoing description. It is intended that the present invention embrace all such alternatives, modifications and variations as fall within the spirit and scope of the appended claims.

What is claimed is:

1. An evaluation apparatus, comprising:
a signal reading block configured to read a recorded signal from an optical recording medium through light irradiation thereto, the signal having been recorded by formation of pits on the medium;
a first waveform equalization block configured to input a reproduced signal obtained by said signal reading block reading said recorded signal, so as to perform a waveform equalization process on said reproduced signal using equalization characteristics that vary the signal level of a reproduced waveform of a short pit of said reproduced signal intensively;
a boundary detection block configured to detect a boundary between a waveform of pits and a waveform of lands from said reproduced signal;
a selective output block configured selectively to output one of two signals based on a result of boundary detection performed by said boundary detection block, one of the two signals being said reproduced signal having undergone said waveform equalization process performed by said first waveform equalization block, the other signal being said reproduced signal not undergoing said waveform equalization process by said first waveform equalization block; and
an evaluation value generation block configured to generate an evaluation value denoting a distribution of signal edge positions based on said reproduced signal having undergone said waveform equalization process output by said selective output block.

2. The evaluation apparatus according to claim 1, further comprising:
a second waveform equalization block configured to input said reproduced signal acquired by said signal reading block reading said recorded signal, so as to perform a waveform equalization process on said reproduced signal, wherein said reproduced signal not undergoing said waveform equalization process is processed by said second waveform equalization block and input to said selective output block.

3. The evaluation block according to claim 2, wherein said second waveform equalization block performs the waveform equalization process using equalization characteristics established either to make signal level changes smaller than those of said first waveform equalization block or to keep the signal level unchanged.

4. The evaluation apparatus according to claim 2, wherein said first and said second waveform equalization blocks are each made up of a finite impulse response filter.

5. The evaluation apparatus according to claim 1, wherein said reproduced signal input to said first waveform equalization block is branched and input to said selective output block as said reproduced signal not undergoing the waveform equalization process performed by said first waveform equalization block.

6. The evaluation apparatus according to claim 1, wherein said boundary detection block detects said boundary based on said reproduced signal yet to be input to said first waveform equalization block.

7. The evaluation apparatus according to claim 1, wherein said evaluation value generation block separately generates two evaluation values, one of the evaluation values being representative of a distribution of edge positions transiting from said lands to said pits, the other evaluation value denoting a distribution of edge positions transiting from said pits to said lands.

8. An evaluation method comprising the steps of:
reading a recorded signal from an optical recording medium through light irradiation thereto, the signal having been recorded by formation of pits on the medium;
inputting a reproduced signal obtained in said reading step reading said recorded signal, so as to perform a waveform equalization process on said reproduced signal using equalization characteristics that vary the signal level of a reproduced waveform of a short pit of said reproduced signal intensively;
selectively outputting one of two signals based on a result of detecting a boundary between a waveform of pits and a waveform of lands from said reproduced signal, one of the two signals being said reproduced signal having undergone said waveform equalization process, the other signal being said reproduced signal not undergoing said first waveform equalization process; and
generating an evaluation value denoting a distribution of signal edge positions based on said reproduced signal output in said selective output step.

9. An evaluation apparatus, comprising:
signal reading means for reading a recorded signal from an optical recording medium through light irradiation thereto, the signal having been recorded by formation of pits on the medium;
first waveform equalization means for inputting a reproduced signal obtained by said signal reading means reading said recorded signal, so as to perform a waveform equalization process on said reproduced signal using equalization characteristics that vary the signal level of a reproduced waveform of a short pit of said reproduced signal intensively;
boundary detection means for detecting a boundary between a waveform of pits and a waveform of lands from said reproduced signal;
selective output means for selectively outputting one of two signals based on a result of boundary detection performed by said boundary detection means, one of the two signals being said reproduced signal having undergone said waveform equalization process performed by said first waveform equalization means, the other signal being said reproduced signal not undergoing said waveform equalization process by said first waveform equalization means; and
evaluation value generation means for generating an evaluation value denoting a distribution of signal edge positions based on said reproduced signal output by said selective output means.

* * * * *